United States Patent [19]

Acampora

[11] 4,320,503
[45] Mar. 16, 1982

[54] SYNCHRONIZING TRANSMISSIONS FROM TWO EARTH STATIONS TO SATELLITE

[75] Inventor: Alfonse Acampora, Staten Island, N.Y.

[73] Assignee: RCA Corporation, New York, N.Y.

[21] Appl. No.: 63,808

[22] Filed: Aug. 6, 1979

[51] Int. Cl.³ .................................. H04J 3/06
[52] U.S. Cl. ............................. 370/104; 455/12; 455/105
[58] Field of Search .............. 370/104; 358/258; 455/12, 13, 49, 51, 103, 105

[56] References Cited

U.S. PATENT DOCUMENTS

| | | | |
|---|---|---|---|
| 3,530,252 | 9/1970 | Puente | 370/104 |
| 3,789,142 | 1/1974 | Shimasaki | 370/104 |
| 3,813,496 | 5/1974 | Maillet | 370/104 |
| 3,922,496 | 11/1975 | Gabbard | 370/104 |
| 4,004,098 | 1/1977 | Shimasaki | 370/104 |

*Primary Examiner*—David L. Stewart
*Attorney, Agent, or Firm*—Samuel Cohen; Carl V. Olson; Robert L. Troike

[57] ABSTRACT

A method of synchronizing the transmissions of alternate video fields or frames from two earth stations over a common uplink channel to a satellite so that the fields or frames arrive in interleaved time periods. A synchronizing pulse is transmitted over a separate channel from a first station to the satellite and back, twice, and to the second station and back. The returned signals provide information for synchronizing transmissions from both stations.

3 Claims, 4 Drawing Figures

SYNCHRONIZING TRANSMISSIONS FROM TWO EARTH STATIONS TO SATELLITE

This invention relates to a system for synchronizing the transmission of two signals, such as two time division multiplexed video frame signals, from two earth stations over a shared uplink frequency channel to a satellite repeater, so that the frame signals arrive at the satellite during non-overlapping time periods. The two signals may be transmitted in time division multiplexed fashion from the satellite over a downlink frequency channel. The two video signals may be from alternate frame (or field) video sources used for video teleconferencing purposes.

It is important that the two video frame signals are transmitted from the two earth stations at times so that the field signals during time periods T arrive at the satellite 12 in non-overlapping relationship. The proper timing depends on the extent to which the path lengths $T_1$ and $T_2$ differ. The satellite may move enough to change the difference in path lengths. Proper timing of transmissions may be accomplished by a synchronizing system including a master clock located in the satellite as described in U.S. Pat. Nos. 3,646,444 and 3,858,007. However, these patented systems cannot be used with existing satellites which do not have master clocks. Another system described in U.S. Pat. No. 3,530,252 issued to J. G. Puente on Sept. 22, 1970, continuously transmits a low power accessing pulse from each earth station to the satellite. When the corresponding pulse is returned to the station, the position in the satellite time frame is observed and the phase varied until the access pulse appears at the beginning of the time slot assigned to that station. This system appears to be not suitable for use when the transmitted signals are analog video signals. Yet another known system is disadvantageous in that is requires the transmission of preamble signals while synchronizing adjustments are made.

In accordance with an example of the present invention, the timing of video frame signals directed to a satellite from two earth stations is controlled by a synchronizing reference signal transmitted over a separate channel from the first earth station to the satellite and back, and to the second earth station and back. The time periods taken by the reference signal to traverse the transmission path distances are measured and used to control the timing of the video signal transmissions from the two earth stations.

Figure 1:
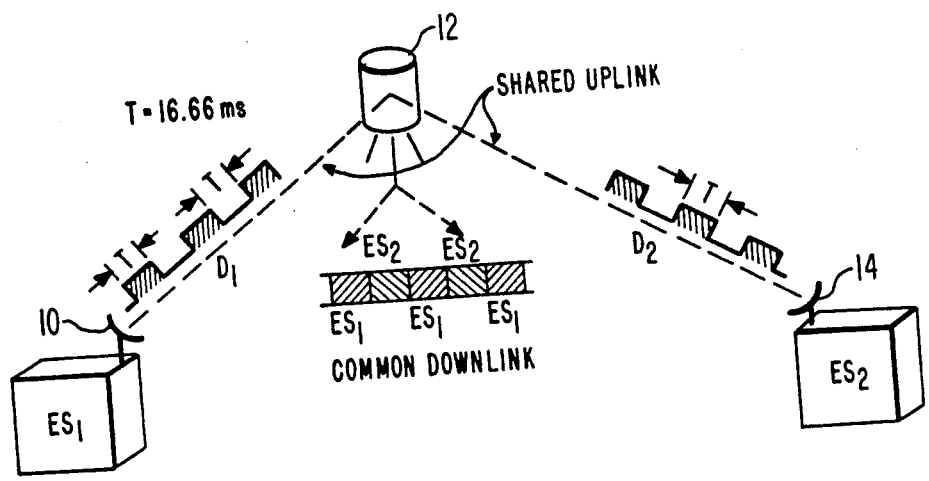
FIG. 1 is a diagram of transmission paths from two earth stations to a repeater satellite.

FIG. 1 shows a first earth station $ES_1$ having an antenna 10 from which alternate video frame (or field) signals are transmitted over a path of length $D_1$ in a time period $T_1$ to a repeating satellite 12. A second earth station $ES_2$ has an antenna 14 from which video frame signals are transmitted over a longer path of length $D_2$ in a time period $T_2$ to a satellite 12. The transmissions over paths $D_1$ and $D_2$ are at the same radio frequency of an uplink channel of the satellite. The video frame signals received by the satellite are interleaved in time division multiplex fashion and forwarded at the difference radio frequency of a downlink channel of the satellite to a receiving earth station (not shown).

The alternate frame video signals transmitted are represented as having time durations T separated by time periods T. Each video frame, according to NTSC broadcast standards, repeats at the rate of 30 frames per second, so that each frame has a period of 33.33 milliseconds. But each frame includes two fields each having a period of 16.66 milliseconds. Only one of the fields of a frame is transmitted from one earth station, and one field of another frame is transmitted from the other earth station. The one field of each frame which is transmitted thus has a duration T of 16.66 milliseconds, and the two fields from the two earth stations when combined in the satellite for retransmission have the duration, 33.33 milliseconds, of one complete frame of a TV video signal.

Figure 2:
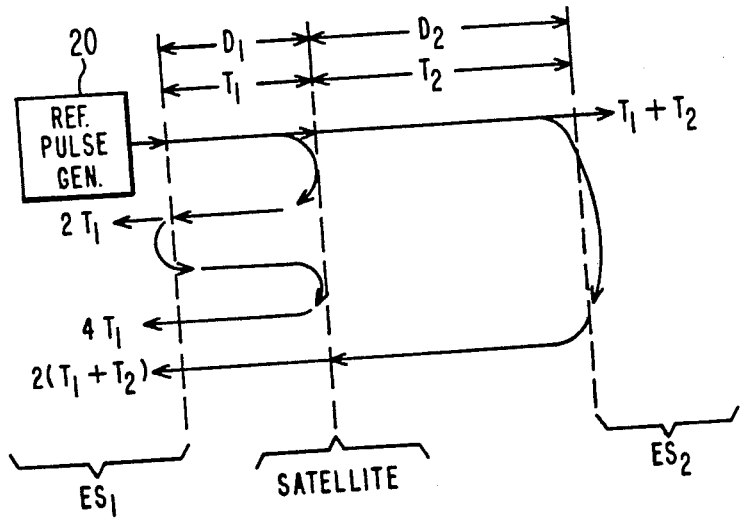
FIG. 2 is a diagram of the paths taken by a synchronizing reference signal from a first earth station.

In order to insure the arrival at the satellite of video field signals from the first earth station at time periods T exactly between the arrival of video field signals from the second earth station, the first earth stations $ES_1$ in FIG. 1 is provided with a reference pulse generator 20 shown in FIG. 2. A reference or synchronizing pulse from generator 20 is periodically transmitted over a narrow band channel, separate from the wide band channel used by the video frame signals, a round trip distance $2D_1$ to the satellite and back to earth station $ES_1$ after a propagation time delay of $2T_1$. The reference signal is immediately retransmitted the distance $2D_1$ to the satellite and back to the earth station after a propagation time delay of $4T_1$ following the first transmission of the reference pulse. The initial reference pulse transmitted to the satellite is also forwarded by the satellite a distance $D_2$ to the second ground station $ES_2$ and back a distance $D_2$ to the satellite, and then a distance $D_1$ from the satellite to the first ground station $ES_1$, where the reference pulse arrives after a propagation delay of $2(T_1+T_2)$ following the time of transmission from the reference pulse generator 20. Reference pulses are continuously transmitted from the first ground station $ES_1$, and returned reference pulses are continuously received by the station $ES_1$ after propagation time delays of $2T_1$, $4T_1$ and $2(T_1+T_2)$.

Figure 3:
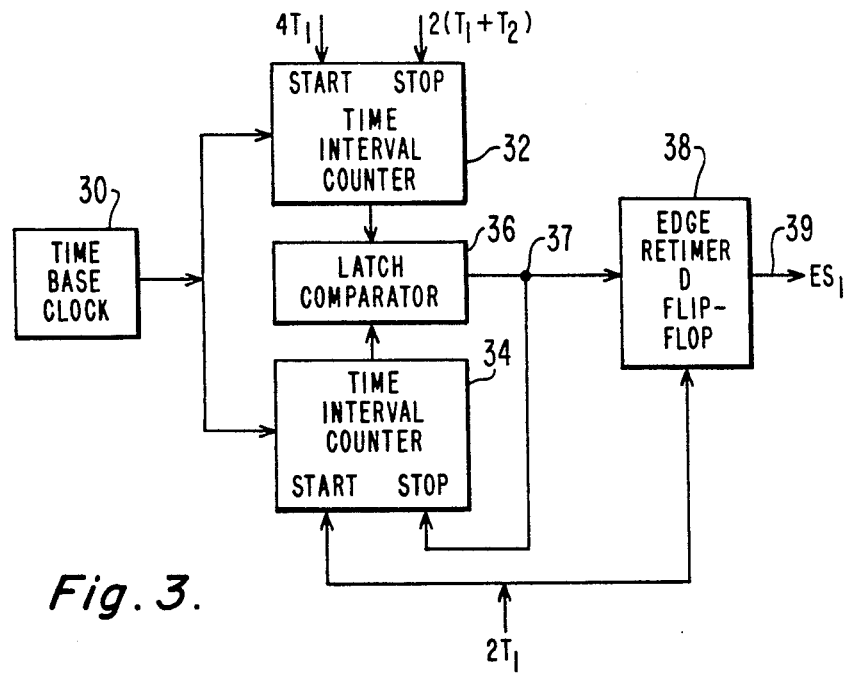
FIG. 3 is a diagram of a signal synchronizing system located at the first earth station.

The returned reference pulses are used to control the operation of a synchronizing circuit of FIG. 3 in the first earth station $ES_1$. The circuit includes a time base clock 30 the output of which is applied to the clock inputs of a first time interval counter 32, and a second time interval counter 34. The counts in the two counters are compared in a latch comparator 36 having an output at 37 when the counts are equal. An equality output signal at 37 is applied to the "stop" input of the second counter 34 and to the trigger input of an edge retimer flip-flop 38. The reference pulse returned after delay $2T_1$ is applied to the 37 start" input of the second counter 34 and to the prime input of the flip-flop 38. The reference pulses returned after delays $4T_1$ and $2(T_1+T_2)$ are applied to the "start" and "stop" signals, respectively, of the first counter 32.

The operation of the synchronizing system will be described with references to the timing chart of FIG. 4 in which one reference pulse from generator 20 is shown at 40 on line a. Line b shows the time of arrival at $T_1+T_2$ of the reference pulse at the second earth station $ES_2$, where it controls the time of transmission of the video field signal from the second earth station ES₂ as shown on line c.

Figure 4:
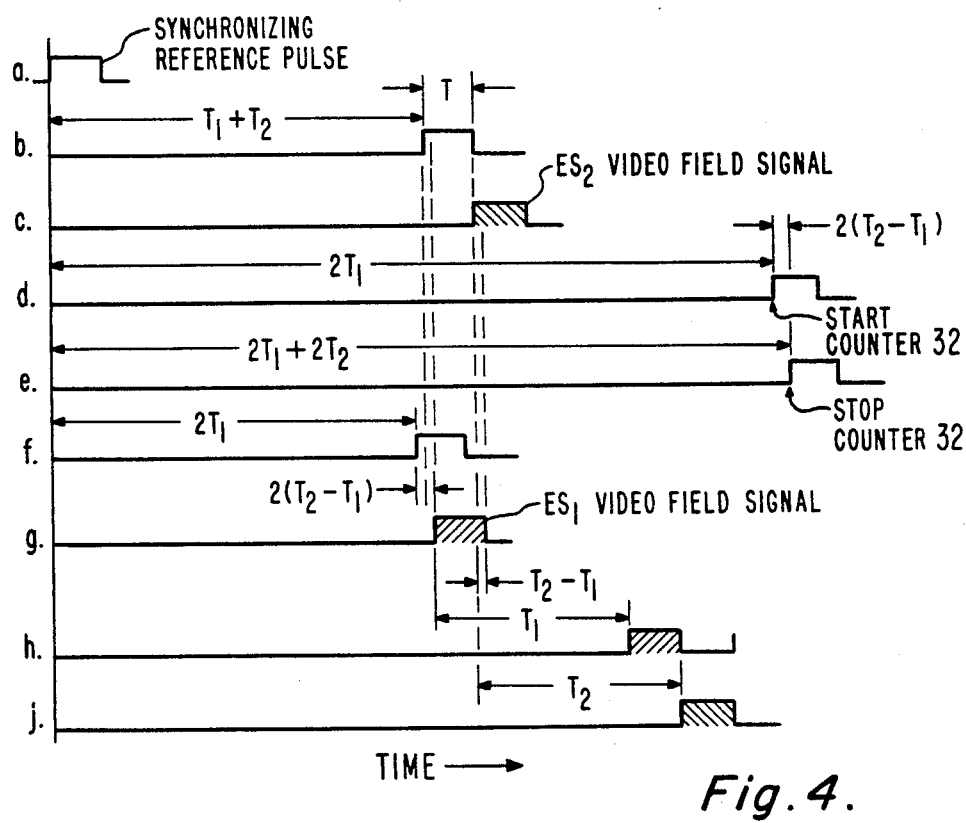
FIG. 4 is a timing chart which will be referred to in describing the operation of the synchronizing system.

Line d of FIG. 4 shows the returned reference pulse at time $4T_1$ which is used to start the first counter 32, and line e shows the returned reference pulse at time $2(T_1+T_2)$ which is used to stop the counter 32. The count in counter 32 is then a value representing the time period $2T_1+2T_2-4T_1$, which is equal to $2(T_1-T_2)$.

Line f of FIG. 4 shows the phase relationship of a returned reference pulse, subsequent to the returned pulses on lines d and e, at time $2T_1$, which is used to prime the flip-flop 38 and to start the first counter 32. Counter 32 is stopped by a signal from comparator 36 when the count in second counter 34 equals the count in first counter 32. This signal from the comparator triggers the flip-flop 38 at a time period $2(T_2-T_1)$ following the time $2T_1$ and produces an output at 39 from the flip-flop which controls the timing of the transmission of a video field, as shown on line g, from the first earth station ES₁.

The time of transmission of a video field signal from the second earth station ES₂ (on line c of FIG. 4) is seen to overlap the time of transmission of a video field signal from the first earth station ES₁ (on line g of FIG. 4). However, the signal from ES₁ arrives at the satellite after a time $T_1$ as shown on line h, and the signal from ES₂ arrives at the satellite after a time $T_2$ as shown on line j. It is seen that the video field signals do not overlap at the satellite, but are exactly interleaved in time division multiplex fashion for transmission on a downlink channel.

The invention has been described by way of example as applied to a system where the reference pulse generator is in the first earth station ES₁ and the first earth station ES₁ is closer to the satellite than is the second earth station ES₂. Certain actual earth stations ES₁ and ES₂ which could use the invention are located with propagation times to the satellite of 123 milliseconds and 136 milliseconds, respectively. As such, the second earth station ES₂ must start its transmission, before the first earth station ES₁ starts its transmission, an amount equal to 13 milliseconds plus or minus T=16.66 milliseconds. It will be understood that the synchronizing pulse generator may, if desired, be located at the earth station ES₂ which is further from the satellite.

What is claimed is:

1. A method of synchronizing transmissions from two earth stations to a satellite so that they are time division multiplexed at the satellite, comprising transmitting a reference pulse from a first nearer earth station to the satellite and back, twice, transmitting the same reference pulse from the satellite to the second more distant earth station and back via the satellite to the first earth station, and using the returned reference pulses to delay the start of transmission from the first nearer earth station.

2. A method of synchronizing transmissions, each having a time duration T and a time spacing T, from first and second spaced earth stations so that they arrive at a satellite in time interleaved fashion, comprising transmitting a reference signal from the first earth station via the satellite to the second earth station arriving after a time $T_1+T_2$ for use in controlling the timing of transmissions from the second earth station, transmitting the same signal, which arrives at time $T_1+T_2$, from the second earth station back via the satellite to the first earth station where it arrives at a time $2(T_1+T_2)$ following the reference signal, also transmitting the original reference signal from the first earth station to the satellite and back in a time $2T_1$, and again to the satellite and back in a total time $4T_1$, and delaying the signal that arrives at the first earth station after a time 2T an amount $2(T_2-T_1)$ equal to the difference between the signals arriving at times $2(T_1+T_2)$ and $4T_1$ to control the timing of transmissions from the first earth station.

3. Apparatus for synchronizing transmissions, each having a time duration T and a time spacing T, from first and second earth stations so that they arrive at a satellite in time interleaved fashion, comprising means for transmitting a reference signal from the first earth station via the satellite to the second earth station to arrive after a time $T_1+T_2$ for use in controlling the timing of transmissions from the second earth station, means for transmitting the same signal, which arrived at time $T_1+T_2$, from the second earth station back via the satellite to the first earth station where it arrives at a time $2(T_1+T_2)$ following the reference signal, means for also transmitting the original reference signal from the first earth station to the satellite and back in a time $2T_1$, and again to the satellite and back in a total time $4T_1$, and means delaying the signal that arrived at the first earth station after a time 2T an amount $2(T_2-T_1)$ equal to the difference between the signals arriving at times $2(T_1+T_2)$ and $4T_1$ to control the timing of transmissions from the first earth station.

* * * * *

UNITED STATES PATENT AND TRADEMARK OFFICE
CERTIFICATE OF CORRECTION

PATENT NO. : 4,320,503

DATED : March 16, 1982

INVENTOR(S): Alfonse (NMN) Acampora

It is certified that error appears in the above-identified patent and that said Letters Patent is hereby corrected as shown below:

Column 2, line 58: delete "37" and insert --"--.

Signed and Sealed this

Twenty-seventh Day of July 1982

|SEAL|

Attest:

GERALD J. MOSSINGHOFF

Attesting Officer — Commissioner of Patents and Trademarks